US008782233B2

(12) United States Patent
Ferris

(10) Patent No.: US 8,782,233 B2
(45) Date of Patent: Jul. 15, 2014

(54) EMBEDDING A CLOUD-BASED RESOURCE REQUEST IN A SPECIFICATION LANGUAGE WRAPPER

(75) Inventor: James Michael Ferris, Cary, NC (US)

(73) Assignee: Red Hat, Inc., Raleigh, NC (US)

(*) Notice: Subject to any disclaimer, the term of this patent is extended or adjusted under 35 U.S.C. 154(b) by 402 days.

(21) Appl. No.: 12/324,674

(22) Filed: Nov. 26, 2008

(65) Prior Publication Data

US 2010/0131649 A1 May 27, 2010

(51) Int. Cl.
*G06F 15/173* (2006.01)
*G06F 9/50* (2006.01)

(52) U.S. Cl.
CPC ............ *G06F 9/5072* (2013.01); *G06F 9/5077* (2013.01)
USPC ............................ 709/226; 709/225; 709/229

(58) Field of Classification Search
CPC ............................ G06F 9/5072; G06F 9/5077
USPC .......................................... 709/225, 226, 229
See application file for complete search history.

(56) References Cited

U.S. PATENT DOCUMENTS

| 6,463,457 | B1 | 10/2002 | Armentrout et al. |
| 6,609,153 | B1 * | 8/2003 | Salkewicz ..................... 709/223 |
| 7,313,796 | B2 | 12/2007 | Hamilton et al. |
| 7,439,937 | B2 | 10/2008 | Ben-Shachar et al. |
| 7,529,785 | B1 | 5/2009 | Spertus et al. |
| 7,546,462 | B2 * | 6/2009 | Upton ........................... 713/170 |
| 7,596,620 | B1 | 9/2009 | Colton et al. |
| 2001/0039497 | A1 | 11/2001 | Hubbard |
| 2002/0069276 | A1 | 6/2002 | Hino et al. |
| 2002/0165815 | A1 | 11/2002 | Vincent |
| 2002/0165819 | A1 | 11/2002 | McKnight et al. |
| 2003/0037258 | A1 | 2/2003 | Koren |
| 2003/0110252 | A1 | 6/2003 | Yang-Huffman |
| 2003/0135609 | A1 | 7/2003 | Carlson et al. |
| 2004/0162902 | A1 | 8/2004 | Davis |
| 2004/0210591 | A1 | 10/2004 | Hirschfeld et al. |
| 2004/0210627 | A1 | 10/2004 | Kroening |
| 2004/0268347 | A1 | 12/2004 | Knauerhase et al. |
| 2005/0131898 | A1 | 6/2005 | Fatula |
| 2005/0144060 | A1 | 6/2005 | Chen et al. |
| 2005/0149294 | A1 * | 7/2005 | Gebhart ........................ 702/186 |

(Continued)

OTHER PUBLICATIONS

"rBuilder and the rPath Appliance Platform", 2007 rPath, Inc., www.rpath.com, 3 pages.

(Continued)

*Primary Examiner* — Hieu Hoang
(74) *Attorney, Agent, or Firm* — Lowenstein Sandler LLP

(57) ABSTRACT

Embodiments relate to systems and methods for embedding a cloud-based resource request in a specification language wrapper. In embodiments, a set of applications and/or a set of appliances can be registered to be instantiated in a cloud-based network. Each application or appliance can have an associated set of specified resources with which the user wishes to instantiate those objects. For example, a user may specify a maximum latency for input/output of the application or appliance, a geographic location of the supporting cloud resources, a processor throughput, or other resource specification to instantiate the desired object. According to embodiments, the set of requested resources can be embedded in a specification language wrapper, such as an XML object. The specification language wrapper can be transmitted to a marketplace to seek the response of available clouds which can support the application or appliance according to the specifications contained in the specification language wrapper.

15 Claims, 6 Drawing Sheets

(56) References Cited

U.S. PATENT DOCUMENTS

| | | |
|---|---|---|
| 2005/0182727 A1 | 8/2005 | Robert et al. |
| 2005/0289540 A1 | 12/2005 | Nguyen et al. |
| 2006/0075042 A1* | 4/2006 | Wang et al. ............... 709/206 |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0028399 A1* | 1/2008 | Gupta et al. ............... 718/1 |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0162625 A1* | 7/2008 | Sedayao et al. ............ 709/202 |
| 2008/0215796 A1 | 9/2008 | Lam et al. |
| 2008/0240150 A1* | 10/2008 | Dias et al. ............... 370/465 |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0265712 A1* | 10/2009 | Herington ............... 718/103 |
| 2009/0271324 A1 | 10/2009 | Jandhyala et al. |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1* | 3/2010 | Smith et al. ............... 718/104 |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0220622 A1 | 9/2010 | Wei |
| 2010/0299366 A1 | 11/2010 | Stienhans et al. |
| 2011/0016214 A1 | 1/2011 | Jackson |
| 2011/0131335 A1 | 6/2011 | Spaltro et al. |

OTHER PUBLICATIONS

White Paper—"rPath Versus Other Software Appliance Approaches", Mar. 2008, rPath, Inc., www.rpath.com, 9 pages.

White Paper—"Best Practices for Building Virtual Appliances", 2008 rPath, Inc., www.rpath.com, 6 pages.

Ferris, "Methods and Systems for Providing a Market for User-Controlled Resources to be Provided to a Cloud Computing Environment", U.S. Appl. No. 12/390,617, filed Feb. 23, 2009.

Ferris, "Methods and Systems for Communicating with Third Party Resources in a Cloud Computing Environment", U.S. Appl. No. 12/390,598, filed Feb. 23, 2009.

Ferris, "Systems and Methods for Extending Security Platforms to Cloud-Based Networks", U.S. Appl. No. 12/391,802, filed Feb. 24, 2009.

DeHaan et al., "Methods and Systems for Flexible Cloud Management", U.S. Appl. No. 12/473,041, filed May 27, 2009.

Ferris, "Methods and Systems for Providing a Universal Marketplace for Resources for Delivery to a Cloud Computing Environment", U.S. Appl. No. 12/475,228, filed May 29, 2009.

DeHaan et al., "Systems and Methods for Power Management in Managed Network Having Hardware-Based and Virtual Reources", U.S. Appl. No. 12/475,448, filed May 29, 2009.

DeHaan et al., "Methods and Systems for Flexible Cloud Management with Power Management Support", U.S. Appl. No. 12/473,987, filed May 28, 2009.

DeHaan, "Methods and Systems for Automated Scaling of Cloud Computing Systems", U.S. Appl. No. 12/474,707, filed May 29, 2009.

DeHaan, "Methods and Systems for Securely Terminating Processes in a Cloud Computing Environment", U.S. Appl. No. 12/550,157, filed Aug. 28, 2009.

DeHaan, "Methods and Systems for Flexible Cloud Management Including External Clouds", U.S. Appl. No. 12/551,506, filed Aug. 31, 2009.

DeHaan, "Methods and Systems for Abstracting Cloud Management to Allow Communication Between Independently Controlled Clouds", U.S. Appl. No. 12/551,096, filed Aug. 31, 2009.

DeHaan, "Methods and Systems for Automated Migration of Cloud Processes to External Clouds", U.S. Appl. No. 12/551,459, filed Aug. 31, 2009.

Ferris, "Methods and Systems for Pricing Software Infrastructure for a Cloud Computing Environment", U.S. Appl. No. 12/551,517, filed Aug. 31, 2009.

Ferris et al., "Methods and Systems for Metering Software Infrastructure in a Cloud Computing Environment", U.S. Appl. No. 12/551,514, filed Aug. 31, 2009.

DeHaan et al., "Systems and Methods for Secure Distributed Storage", U.S. Appl. No. 12/610,081, filed Oct. 30, 2009.

Ferris et al., "Methods and Systems for Monitoring Cloud Computing Environment", U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

Ferris et al., "Methods and Systems for Verifying Software License Compliance in Cloud Computing Environments", U.S. Appl. No. 12/627,643, filed Nov. 30, 2009.

Ferris et al., "Systems and Methods for Service Aggregation Using Graduated Service Levels in a Cloud Network", U.S. Appl. No. 12/628,112, filed Nov. 30, 2009.

Ferris et al., "Methods and Systems for Generating a Software License Knowledge Base for Verifying Software License Compliance in Cloud Computing Environments", U.S. Appl. No. 12/628,156, filed Nov. 30, 2009.

Ferris et al., "Methods and Systems for Converting Standard Software Licenses for Use in Cloud Computing Environments", U.S. Appl. No. 12/714,099, filed Feb. 26, 2010.

(56) References Cited

OTHER PUBLICATIONS

Ferris et al., "Systems and Methods for Managing a Software Subscription in a Cloud Network", U.S. Appl. No. 12/714,096, filed Feb. 26, 2010.
Ferris et al., "Methods and Systems for Providing Deployment Architectures in Cloud Computing Environments", U.S. Appl. No. 12/714,427, filed Feb. 26, 2010.
Ferris et al., "Methods and Systems for Matching Resource Requests with Cloud Computing Environments", U.S. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments Via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris et al., "Systems and Methods for Aggregate Monitoring of Utilization Data for Vendor Products in Cloud Networks", U.S. Appl. No. 12/790,039, filed May 28, 2010.
DeHaan, "Methods and Systems for Abstracting Cloud Management", U.S. Appl. No. 12/474,113, filed May 28, 2009.
Ferris, et al., "Systems and Methods for Cominatorial Optimization of Multiple Resources Across a Set of Cloud-Based Networks", U.S. Appl. No. 12/953,718, filed Nov. 24, 2010.
Ferris et al., "Systems and Methods for Matching a Usage History to a New Cloud", U.S. Appl. No. 12/953,757, filed Nov. 24, 2010.
Ferris et al., "Systems and Methods for Identifying Usage Histories for Producing Optimized Cloud Utilization", U.S. Appl. No. 12/952,930, filed Nov. 23, 2010.
Ferris et al., "Systems and Methods for Identifying Service Dependencies in a Cloud Deployment", U.S. Appl. No. 12/952,857, filed Nov. 23, 2010.
Ferris et al., "Systems and Methods for Migrating Subscribed Services in a Cloud Deployment", U.S. Appl. No. 12/955,277, filed Nov. 29, 2010.
Ferris et al., "Systems and Methods for Migrating Subscribed Services from a Set of Clouds to a Second Set of Clouds", U.S. Appl. No. 12/957,281, filed Nov. 30, 2010.
Morgan, "Systems and Methods for Generating Multi-Cloud Incremental Billing Capture and Administration", U.S. Appl. No. 12/954,323, filed Nov. 24, 2010.
Morgan, "Systems and Methods for Aggregating Marginal Subscription Offsets in a Set of Multiple Host Clouds", U.S. Appl. No. 12/954,400, filed Nov. 24, 2010.
Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.
Morgan, "Systems and Methods for Managing Subscribed Resource Limits in Cloud Network Using Variable or Instantaneous Consumption Tracking Periods", U.S. Appl. No. 12/954,352, filed Nov. 24, 2010.
Ferris et al., "Systems and Methods for Migrating Software Modules into One or More Clouds", U.S. Appl. No. 12/952,701, filed Nov. 23, 2010.
Ferris et al., "Systems and Methods for Brokering Optimized Resource Supply Costs in Host Cloud-Based Network Using Predictive Workloads", U.S. Appl. No. 12/957,274, filed Nov. 30, 2010.
Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.
Morgan, "Systems and Methods for Generating Optimized Resource Consumption Periods for Multiple Users on Combined Basis", U.S. Appl. No. 13/037,359, filed Mar. 1, 2011.
Morgan, "Systems and Methods for Metering Cloud Resource Consumption Using Multiple Hierarchical Subscription Periods", U.S. Appl. No. 13/037,360, filed Mar. 1, 2011.
Morgan, "Systems and Methods for Generating Marketplace Brokerage Exchange of Excess Subscribed Resources Using Dynamic Subscription Periods", U.S. Appl. No. 13/037,351, filed Feb. 28, 2011.
Morgan, "Systems and Methods for Detecting Resource Consumption Events Over Sliding Intervals in Cloud-Based Network", U.S. Appl. No. 13/149,235, filed May 31, 2011.
Morgan, "Systems and Methods for Triggering Workload Movement Based on Policy Stack Having Multiple Selectable Inputs", U.S. Appl. No. 13/149,418, filed May 31, 2011.
Morgan, "Systems and Methods for Cloud Deployment Engine for Selective Workload Migration or Federation Based on Workload Conditions", U.S. Appl. No. 13/117,937, filed May 27, 2011.
Morgan, "Systems and Methods for Tracking Cloud Installation Information Using Cloud-Aware Kernel of Operating System", U.S. Appl. No. 13/149,750, filed May 31, 2011.
Morgan, "Systems and Methods for Introspective Application Reporting to Facilitate Virtual Machine Movement Between Cloud Hosts", U.S. Appl. No. 13/118,009, filed May 27, 2011.
Morgan, "Systems and Methods for Self-Moving Operating System Installation in Cloud-Based Network", U.S. Appl. No. 13/149,877, filed May 31, 2011.
Red Hat Inc., NonFinal Office Action for U.S. Appl. No. 12/130,929, mailed Oct. 5, 2011.
Red Hat Inc., Final Office Action for U.S. Appl. No. 12/130,929, mailed Feb. 29, 2012.
USPTO, Advisory Action for U.S. Appl. No. 12/130,929 mailed on May 4, 2012.

\* cited by examiner

EMBEDDING A CLOUD-BASED RESOURCE REQUEST IN A SPECIFICATION LANGUAGE WRAPPER

FIELD

The present teachings relate to systems and methods for embedding a cloud-based resource request in a specification language wrapper, and more particularly to platforms and techniques for incorporating application and/or software appliance specifications into an instantiation or update request to a cloud-based network.

BACKGROUND OF RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application. Another type of software entity that has found certain application in certain spaces is software appliances, which generally speaking can represent relatively self-contained software installations including full or customized partial operating system installations, combined with selected applications in a single installation or update package.

Currently, when a user desires to can lease or subscribe to the set of resources, the user may request the set of resources based on their service level requirements and then receive a price for the request. Currently, no mechanism exists for users to view different pricing information for different service levels, or based on different source clouds. Additionally, no mechanism exists for users to view pricing information for differentiated service or resource levels that may be required for different installed software applications and/or software appliances. Thus, there is a need in the art for methods and systems that provide relevant service level and subscription cost information that is differentiated according to the target application and/or appliance that a user wishes to instantiated or update from the cloud.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Figure 1:
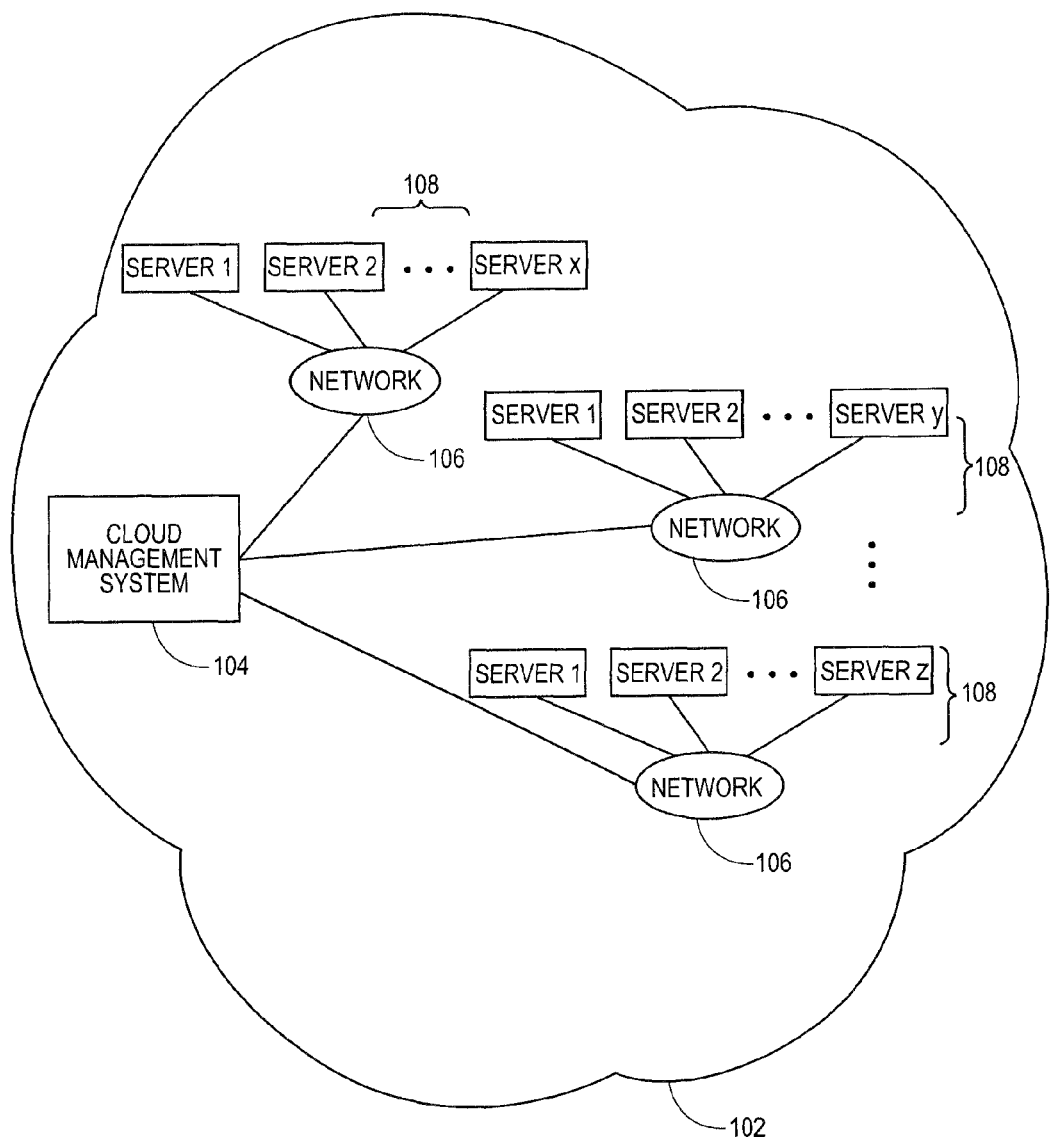
FIG. 1 illustrates an overall cloud system architecture in which various embodiments of the present teachings can be practiced.

Embodiments of the present teachings relate to systems and methods for systems and methods for embedding a cloud-based resource request in a specification language wrapper. More particularly, embodiments relate to platforms and techniques for generating a cloud-based resource request for one or more applications, and/or one or more software appliances, in which the application/appliance requests processing, memory, network, and/or other resources to instantiate or update those objects. According to various embodiments, the cloud-based resource request can be incorporated, embedded, or "wrapped" in a specification language wrapper that permits the requesting user or resource to specify in greater detail the types of applications, operating system, memory, or other resources the requesting application/appliance will need to be instantiated and/or updated. The specification language wrapper can be or include, for example, extensible markup language (XML), or other languages, code, or platforms. According to embodiments, the cloud-based resource request with specification language wrapper can be transmitted to a marketplace system or platform configured to communicate with a set of clouds. The marketplace system can interrogate the set of clouds to identify those clouds having available resources matching or most closely matching the resources and parameters specified in the cloud-based resource requested embedded in the specification language wrapper. The marketplace system, via an internal management server or other logic, can use that data to identify and extract and collect the requested resources. The marketplace system can then aggregate or transmit the corresponding resources to instantiate and/or update the requesting application and/or software appliance, on a differentiated basis according to the particular needs of the requesting object.

Embodiments of the present teachings thereby relate to systems and methods which operate in a marketplace environment based on cloud computing networks. More particularly embodiments relate to platforms and techniques in which a cloud marketplace system provides details on the resources and services provided by the cloud computing environments, to allow users to evaluate the resources and services provided by the cloud computing environments in relation to the specific requirements of desired applications and/or software appliances.

According to embodiments, in general, the overall cloud marketplace system can be configured to communicate with multiple cloud computing environments in order to ascertain the details for the resources and services provided by the cloud computing environments. In particular, the cloud marketplace system can be configured to retrieve, from the cloud computing environments, resource and service data which describes the capabilities, services, status, and cost of the cloud computing environment. The resource and service data can include computing resources and services provided by the cloud computing environments, computing resources and services available in the cloud computing environments at particular time periods, cost data for computing resources and services provided by the cloud computing environments, and status data for the cloud computing environments at particular time periods.

In embodiments, in order to acquire the resource and service data, the cloud marketplace system can be configured to request the resource and service data from cloud management systems located in the cloud computing environments. Likewise, the cloud marketplace system can be configured to communicate with the resources of the cloud computing environments directly in order to obtain the resource and service data.

In embodiments, the cloud marketplace system can be configured to maintain a repository for the resource and service data in order to provide the marketplace for the cloud computing environments. The cloud marketplace system can be configured to update the repository periodically to maintain current resource and service data for the cloud computing environments. Likewise, when providing the marketplace, the cloud marketplace system can obtain the resource and service data, on-demand, and directly from the cloud computing environments.

In embodiments, to provide the marketplace, the cloud marketplace system can be configured receive a request for information pertaining to the resources or services provided by or available in the cloud computing environments. The cloud marketplace system can be configured to search the repository for resource and service data relating to the request. Likewise, the cloud marketplace system can be configured to obtain the resource and service data directly from the cloud computing environments. Once located, the cloud marketplace system can be configured to generate a marketplace report detailing the resource and service data matching the request. The cloud marketplace system can be configured to provide the report to initiator of the request.

In embodiments, the cloud marketplace system can be configured to utilize the resource and service data to provide migration services for virtual machines initiated in the cloud computing environments. In particular, for a particular virtual machine or machines, the cloud marketplace system can be configured to receive a request to monitor the resource and service data of the cloud computing environments for the occurrence of a particular event. The event can be occur when a portion of the resource and service data reaches a threshold value received in the request to migrate. The cloud marketplace system can be configured to monitor the cloud computing environments in order to determine when the resources or services data indicates the occurrence of the event. Upon occurrence of the event, the cloud marketplace system can be configured to migrate the virtual machine or machines to a new cloud computing environment with the resources and services data matching the event.

By providing a marketplace for the services and resources of cloud computing environments, users can perform efficient cost-accounting for, shopping for, and migrations of existing and planned workloads to the best possible cloud computing environment. As such, the user can locate and find the best priced and best quality service for their intended applications and/or software appliances. Reference will now be made in detail to exemplary embodiments of the present teachings, which are illustrated in the accompanying drawings. Where possible the same reference numbers will be used throughout the drawings to refer to the same or like parts.

FIG. 1 illustrates an overall cloud computing environment, in which systems and methods for embedding a cloud-based resource request in a specification language wrapper can operate, according to embodiments of the present teachings. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud. 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102; either on an on-demand or subscribed or decided basis.

With the resource requirements identified, the cloud management system 104 can extract and build the set of virtual machines or other resources on a dynamic or on-demand basis. For example, one set of resource servers 108 can respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 can respond to a request for instantiation at a programmed time with an offer to deliver the specified quantity of processor cycles within a specific amount of time, such as the next 12 hours.

The cloud management system 104 can select group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet Protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in set of resource servers 108 indicating a status regarding the provisioning of their respective resources. Various sets of resource servers can confirm, for example, the availability of a dedicated amount of processor cycles, amounts of electronic memory, communications bandwidth, or applications or other software prepared to be served.

Figure 2:
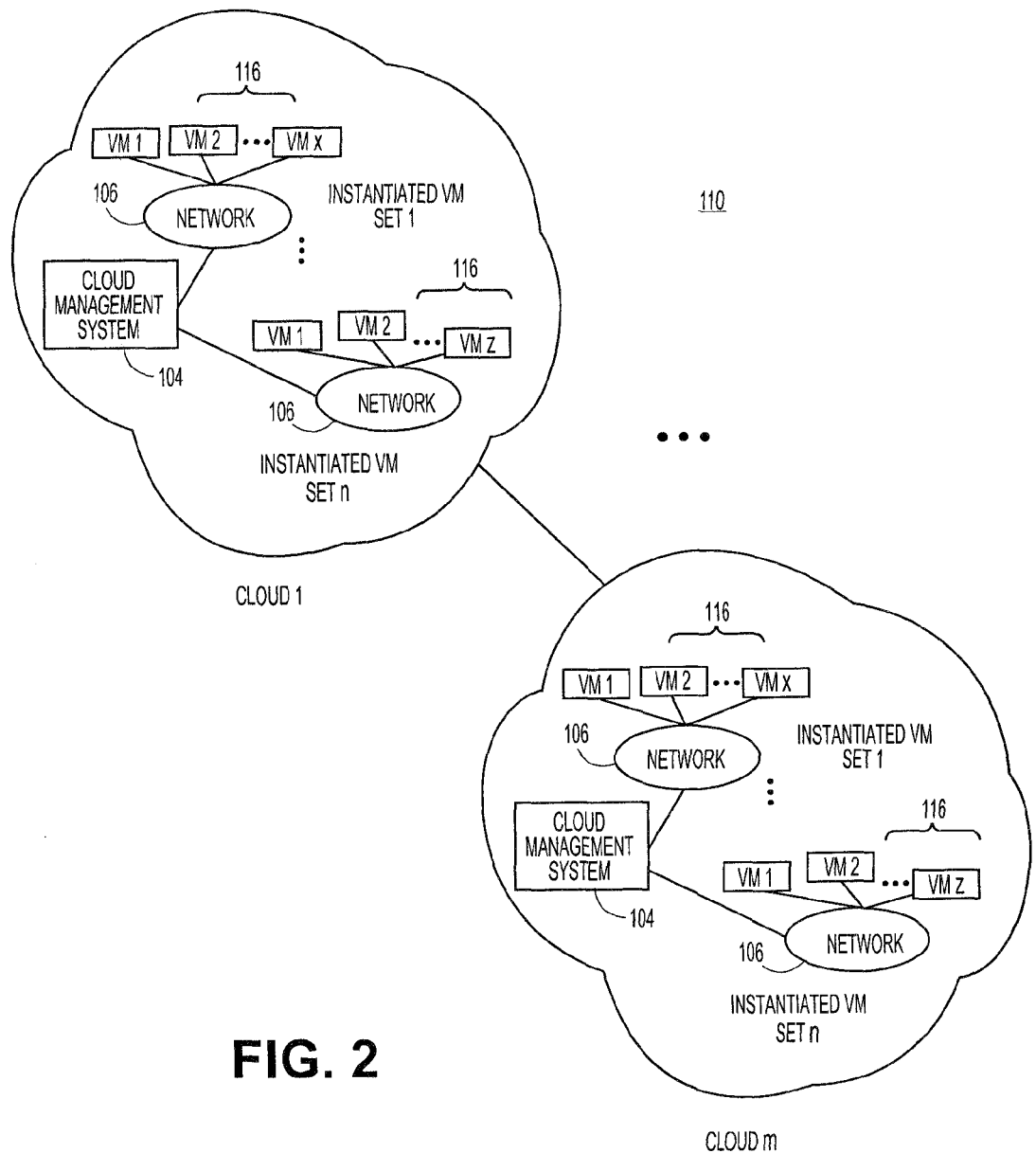
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other numbers of virtual machines to be made available to users on a network 114, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or delivery a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
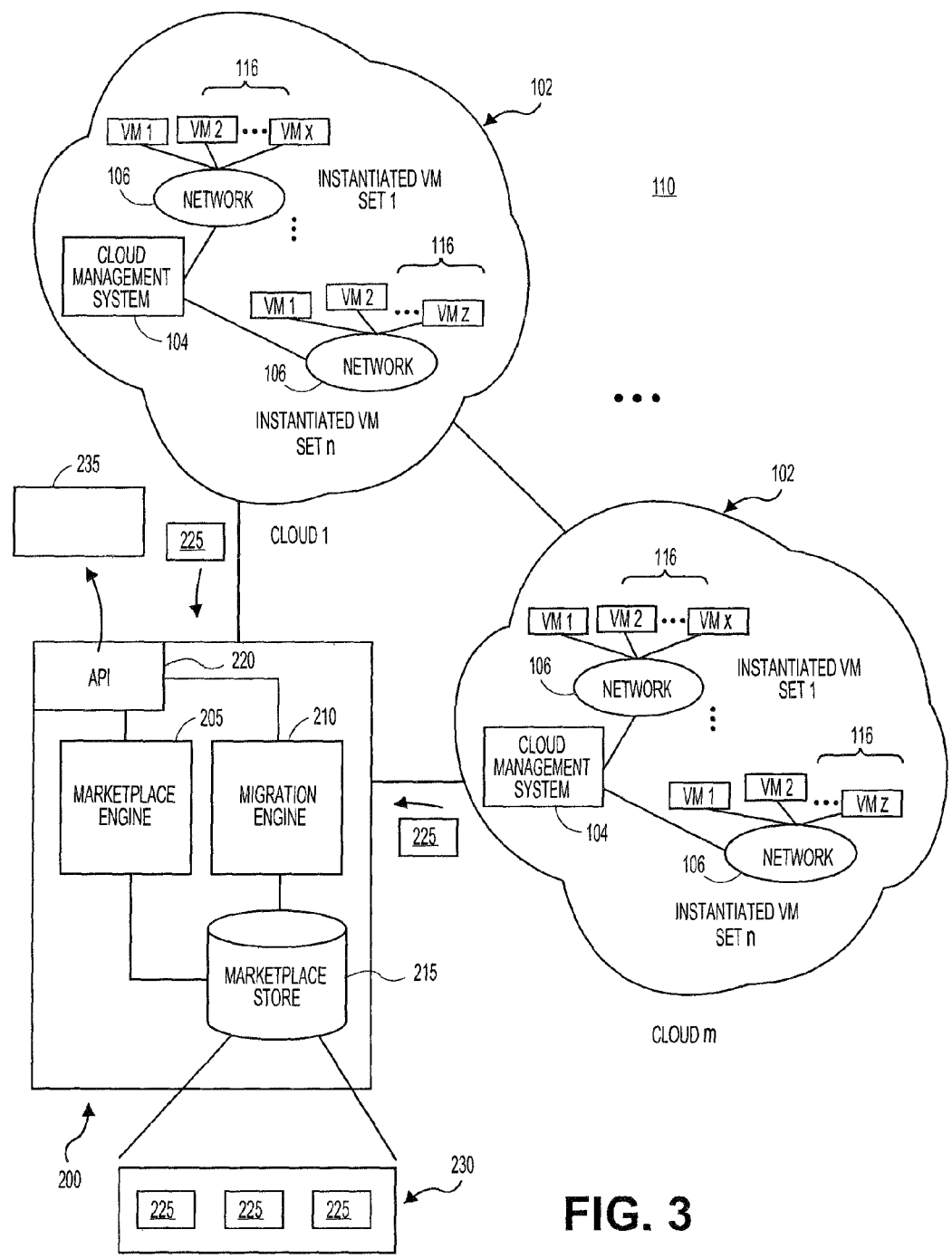
FIG. 3 illustrates an overall marketplace environment in which systems and methods for embedding a cloud-based resource request in a specification language wrapper can operate, according to various embodiments.

FIG. 3 illustrates aspects of a cloud marketplace system 200 and its interaction with various clouds 102, according to various embodiments. In embodiments, the cloud marketplace system 200 provides a marketplace for the services provided by clouds 102. In embodiments as shown, the cloud marketplace system 200 can comprise a a marketplace engine 205, a migration engine 210, a marketplace store 215, and an application programming interface (API) 220. The marketplace engine 205 can be configured to contain control logic for performing the marketplace processes and for communicating with the clouds 102, API 220, and marketplace store 215. In embodiments as shown, the cloud marketplace system 200 provides a marketplace for the services provided by clouds 102.

In embodiments, the cloud marketplace system 200 can be configured to communicate with the clouds 102 in order to ascertain the details for the resources and services provided by the clouds 102. In particular, the cloud marketplace system 200 can be configured to retrieve, from the clouds 102, resource and service data 225 which describes the capabilities, services, status, and cost of the clouds 102. The resource and service data 225 can include data detailing computing resources and services provided by the clouds 102, computing resources and services available in the clouds 102 at particular time periods, cost for the services provided by the clouds 102, and status for the clouds 102 at particular time periods.

In embodiments, the data detailing the computing resources and services provided by the clouds 102 can include resource data specifying the sets of resources servers 108 contained in the clouds 102 and the computing resources provided by the sets of resources servers 108 (computing cycles, bandwidth, memory, storage). Additionally, the data detailing the computing resources and services provided by the clouds 102 can include service data specifying particular services provided by the clouds 102 such as identity management services, cloud management services, application and appliance building services, and the like.

In embodiments, the data detailing the computing resources and services available in the clouds 102 at particular time periods can include data specifying computing resources and services available in the clouds 102 current or at some future time. Additionally, the data detailing the computing resources and services available in the clouds 102 at particular time periods can include data specifying service level agreements for the cloud 102 for a period of time.

In embodiments, the data detailing the cost for the resources and services provided by the clouds 102 can include data such as the cost for subscription to the clouds 102, the cost for usage of the resources and services of the clouds 102, and discounts of the costs based on the usage. For example, the cost for usage can include the cost for the resources consumed to support the virtual machines and can include the cost for the utilization of the virtual machines by the user or third parties. These can include the cost for the instantiated time of the virtual machines, the computing resource consumed by the virtual machines (computing cycles, bandwidth), the time frame of the computing resource consumption (peak time, off-peak time), and combinations thereof. The cost data can include cost data for a current time or cost data for resources and services in the future.

In embodiments, the data detailing the status for the clouds 102 at particular time periods can include data specifying the resources and services current being utilized in the clouds 102. For example, the status data can include virtual machines currently instantiated in the clouds 102 and the computing resources of the sets of resources servers 108 (computing cycles, bandwidth, memory, storage) currently utilized.

In embodiments, in order to acquire the resource and service data 225, the cloud marketplace system 200 can be configured to request the resource and service data 225 from cloud management systems 104 located in the clouds 102. Likewise, the cloud marketplace system 200 can be configured to communicate with the set of resource servers 108 directly in order to obtain the resource and service data 225. The cloud marketplace system 200 can be configured to communicate with the clouds 102 via network 106 or any other available public or private network. In particular, marketplace engine 205 can be configured to communicate with the clouds 102.

In embodiments, the cloud marketplace system 200 can be configured to maintain a repository 230 for the resource and service data 225 in order to provide the marketplace for the clouds 102. In particular, the marketplace engine 205 can be configured to maintain the repository 230. The repository 230 can be configured in any format to allow the resource and service data 225 to be stored and retrieved. For example, the repository can be configured in any type of proprietary or open-source database format. The repository 230 can include a record for each cloud 102 that includes various searchable data fields for storing the resource and service data 225 for that particular cloud.

The cloud marketplace system 200 can be configured to update the repository 230 periodically to maintain current resource and service data 225 for the clouds 102. Likewise, when providing the marketplace, the cloud marketplace system 200 can be configured to obtain the resource and service data 225, on-demand, and directly from the clouds 102.

In embodiments, to provide the marketplace, the cloud marketplace system 200 can be configured receive a request for information pertaining to the resources or services provided by or available in the clouds 102. For example, a initiator may request information on clouds 102 that can provide a certain level of computing resources at a specific cost during a specific time period. The initiator of the request the information in order to see all available resources of the clouds 102 that may meet the initiators requirements. As such, the request can include the information regarding the resources desired by the initiator. This can include the desired computing resources, the time period for the resources, the duration of the resources, the cost of the resources, services provided by the cloud, the availability of the resources, and the like.

In particular, the marketplace engine 205 can be configured to communicate with the initiator of the request via API 220. API 220 can be configured to generate GUIs, e.g. dialog boxes, web pages, as required by marketplace engine 205 and to provide an interface for receiving requests. The initiator of the request can be a user desiring utilization of the clouds 102 or the cloud management systems 104 of the clouds 102.

Once the request is received, the cloud marketplace system 200 can be configured to search the repository 230 for resource and service data 225 relating to the request. In particular, the marketplace engine 205 can be configured to access the repository 230 stored in marketplace store 215 and search the repository 230 for resource and service data 225 matching the request. Likewise, the cloud marketplace system 200 can be configured to obtain the resource and service data 225 directly from the clouds 102.

Once located, the cloud marketplace system 200 can be configured to generate a marketplace report 235 detailing the resource and service data 225 matching the request. For example, the marketplace report 235 can include a list of clouds 102 matching the request alone with the data detailing computing resources and services provided by the matching clouds 102, computing resources and services available in the matching clouds 102 at particular time periods specified in the request, cost for the services and resources requested, and status for the matching clouds 102 at particular time periods specified in the request.

In particular, the marketplace engine 205 can be configured to extract the matching resource and service data from repository 230. Marketplace engine 205 can be configured to arrange the matching resource and service data 225 in marketplace report 235.

After generating the marketplace report 235, the cloud marketplace system 200 can be configured to provide the marketplace report 235 to the initiator of the request. In particular, the marketplace engine 205 can be configured to provide the marketplace report 235 via API 220.

Once the report is received, the initiator or the user can make a determination on which resources of the clouds 102 to utilize. This can include utilizing resources from a single cloud 102 or resources from multiple clouds 102. For example, the initiator can select one or more cloud 102 with which to instantiate a virtual machine or machines. The initiator can make a request for the resources directly to the clouds 102. Likewise, the cloud marketplace system 200 can be configured to receive the initiators requests for resources and forward the request to the clouds 102, or reserve the resources directly.

In embodiments, the cloud marketplace system 200 can be configured to utilize the resource and service data to provide automatic migration services for virtual machines initiated in the clouds 102. In particular, the migration engine 210 can be configured to contain control logic for performing the migration processes and for communicating with the clouds 102, API 220, and marketplace store 215.

In embodiments, for a particular virtual machine or machines instantiated in one of the clouds 102, the cloud marketplace system 200 can be configured to receive a request to monitor the resource and service data 225 of the clouds 102 for the occurrence of a particular event. The event can be the occurrence of a particular resource or service becoming available in a cloud 102. The event can be occur when a portion of the resource and service data 225 reaches a threshold value received in the request to migrate. For example, a user can request that the cloud marketplace system 200 migrate a virtual machine or machines when a particular computing resources at a specified cost becomes available in one of the clouds 102.

In particular, the migration engine 210 can be configured to communicate with the user or the initiator of the request via API 220. API 220 can be configured to generate GUIs, e.g. dialog boxes, web pages, as required by migration engine 210 and to provide an interface for receiving requests.

To migrate the virtual machine or machines, the cloud marketplace system 200 can be configured to monitor the clouds 102 in order to determine when the resources or services data 225 indicates the occurrence of the event. In particular, the migration engine 210 can be configured to periodically search the repository 230 for the resources and services data 225 matching event. Likewise, the migration engine 210 can be configured to obtain the resource and service data 225, periodically, directly from the clouds 102.

Upon occurrence of the event, the cloud marketplace system 200 can be configured to migrate the virtual machine or machines to a new cloud 102 with the resources and services data matching the event. For example, the cloud marketplace system 200 can determine that a new cloud 102 has resources or services available that match the user's request and can migrate the virtual machines to the new cloud 102. In particular, the migration engine 210 can be configured send an instruction, to the cloud 102 currently instantiating the virtual machine or machines, to migrate the virtual machine or machines to the new cloud 102. The instruction can include an identification of the virtual machine or machines and an identification of the new cloud 102. Likewise, the migration engine 210 can be configured to retrieve the virtual machine or machines from the cloud 102 currently instantiating the virtual machine or machines and pass the virtual machine or machines to the new cloud 102 for instantiation.

Once migrated, the cloud marketplace system 200 can be configured to notify the user or initiator of the migration. In particular, migration engine 210 can be configured to notify the user or initiator via API 220.

Figure 4:
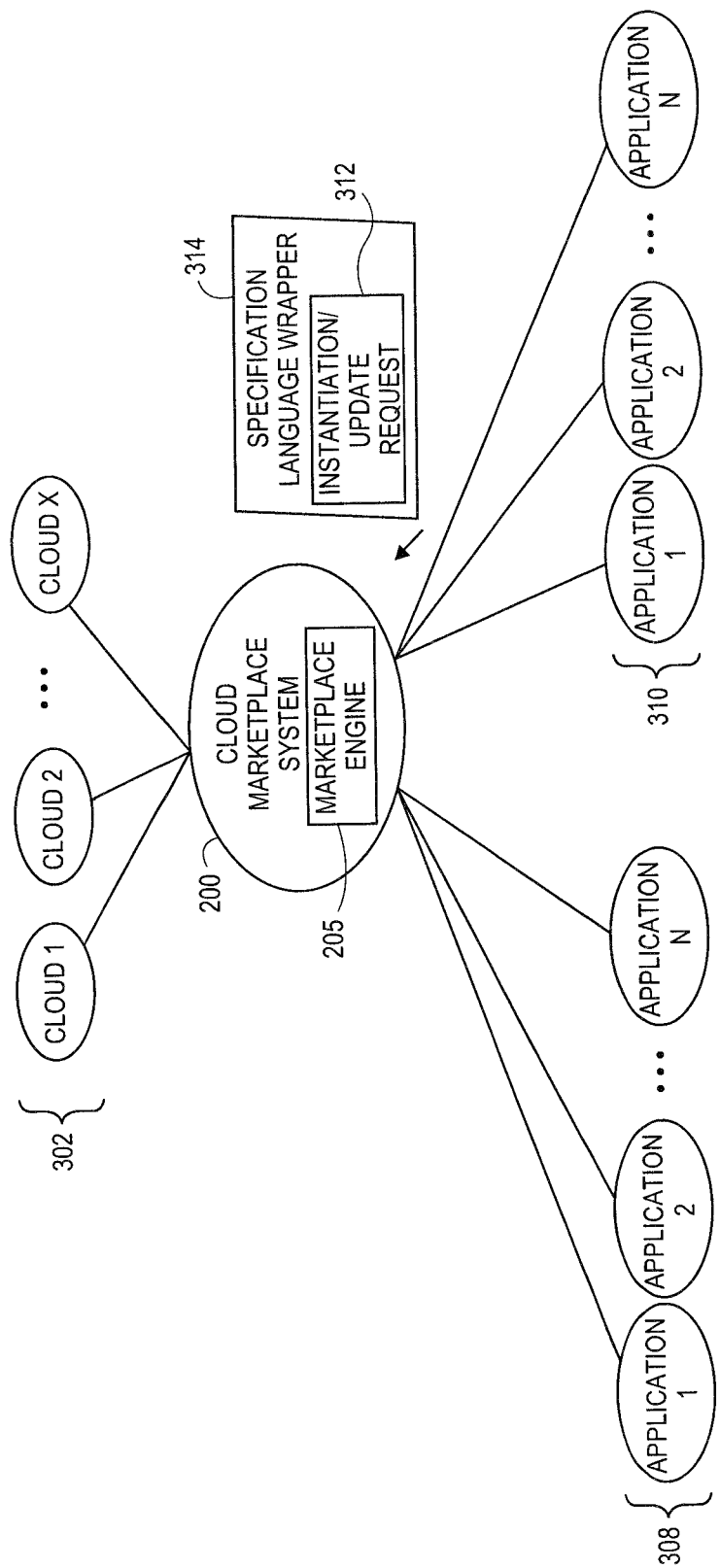
FIG. 4 illustrates an overall marketplace environment in which systems and methods for embedding a cloud-based resource request in a specification language wrapper can operate including the generation of specification language wrappers, according to various embodiments.

FIG. 4 illustrates an overall system 300, consistent with systems and methods for embedding a cloud-based resource request in a specification language wrapper, according to various embodiments. In embodiments as shown, at least one of a set of applications 308 and/or set of software appliances 310 can generate an instantiation or update request 312 to invoke and acquire resources from one or more cloud-based networks. In embodiments, the instantiation or update request 312 can be or include a request to instantiate a specified number of virtual machines, and/or can specify baseline virtual machine parameters such as processor cycles, allocated memory, and other parameters. In embodiments, the instantiation or update request 312 can be embedded within a specification language wrapper 314. In embodiments, the specification language wrapper 314 can be encoded in extensible markup language (XML), and/or other languages, code, or platforms. In embodiments, the specification language wrapper 314 can encode the specific application, operating system, hardware, or other specifications of the instantiated/updated object, and/or the necessary resources to be extracted from the cloud to satisfy the instantiation or update request. According to embodiments, the specification language wrapper 314 can extend the types and content of data used to characterize the requirements of the requesting application or appliance, to locate clouds best able to provide specific resource combinations, and permit resources to be extracted from those source clouds on a highly differentiated basis.

In embodiments as shown, the instantiation or update request 312 embedded within a specification language wrapper 314 can be transmitted to a cloud marketplace system 200. Cloud marketplace system 200 can serve as a collection point and market crossing point for resource request on the one hand, and source clouds on the other. The instantiation or update request 312 embedded within a specification language wrapper 314 can be received and decoded via a marketplace engine 205 within or associated with cloud marketplace system 200. Marketplace engine 205, or another management server or logic, can identify required resources based on that data, and interrogate a set of clouds 304 to identify clouds having the requested resources. The marketplace engine 205 can then aggregate and/or transmit or channel those resources to the requesting application and/or appliance, on a highly tailored basis. In embodiments, the marketplace engine 205 can monitor the set of applications 308, set of software appliances 310, and/or set of clouds 304 to detect further requests, updates, and/or changes in service level. Marketplace engine 205 in embodiments can generate new resource requests and reconfigure source clouds to meet resource requirements that may vary over time.

Figure 5:
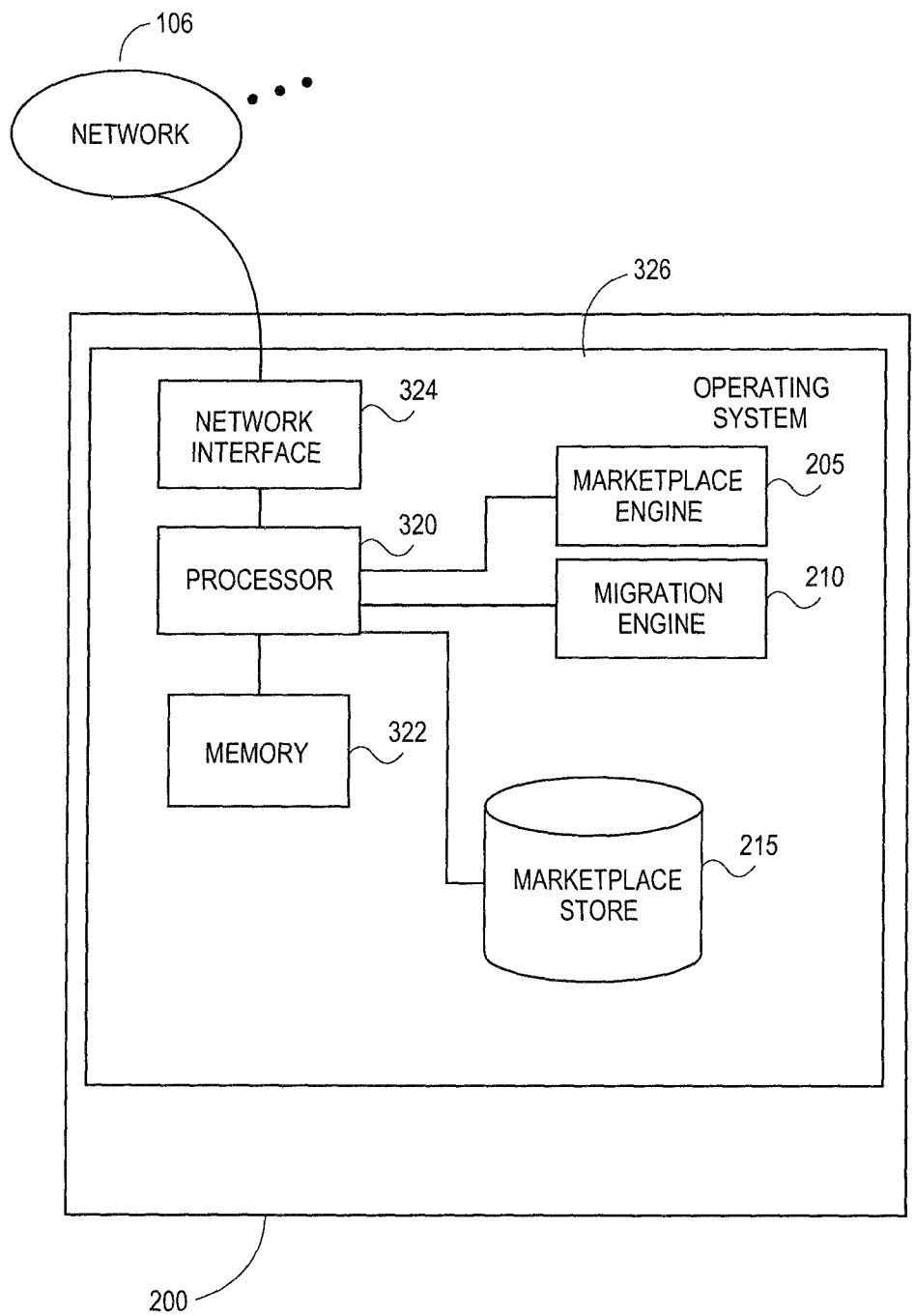
FIG. 5 illustrates an exemplary hardware implementation of a marketplace system, according to various embodiments.

FIG. 5 illustrates an exemplary diagram of hardware and other resources that can be incorporated in a cloud marketplace system 200 configured to communicate with instantiated clouds 102, set of clouds 302, and users or initiators via one or more networks 106, according to embodiments. In embodiments as shown, the cloud marketplace system 200 can comprise a processor 320 communicating with memory 322, such as electronic random access memory, operating under control of or in conjunction with operating system 326. Operating system 326 can be, for example, a distribution of the Linux™ operating system, the Unix™ operating system, or other open-source or proprietary operating system or platform. Processor 320 also communicates with the marketplace store 215, such as a database stored on a local hard drive. Processor 320 further communicates with network interface 324, such as an Ethernet or wireless data connection, which in turn communicates with one or more networks 106, such as the Internet or other public or private networks. Processor 320 also communicates with marketplace store 215 and the marketplace engine 205, to execute control logic and perform the marketplace process described herein. Additionally, processor 320 also communicates with marketplace store 215 and the migration engine 210, to execute control logic and perform the migration process described above. Other configurations of the cloud marketplace system 200, associated network connections, and other hardware and software resources are possible.

While FIG. 5 illustrates the cloud marketplace system 200 as a standalone system comprises a combination of hardware and software, the cloud marketplace system 200 can also be implemented as a software application or program capable of being executed by a convention computer platform. Likewise, the cloud marketplace system 200 can also be implemented as a software module or program module capable of being incorporated in other software applications and programs. In either case, the cloud marketplace system 200 can be implemented in any type of conventional proprietary or open-source computer language.

Additionally, as illustrated in FIG. 5, the cloud marketplace system 200 can be a standalone system capable of being access by or controlled by a user or initiator of the marketplace and migration processes. Likewise, the cloud marketplace system 200 can be integrated into one or more of the clouds 102. Additionally, the cloud marketplace system 200 can be integrated into one or more of the systems of, the clouds 102 such as the cloud management systems.

Figure 6:
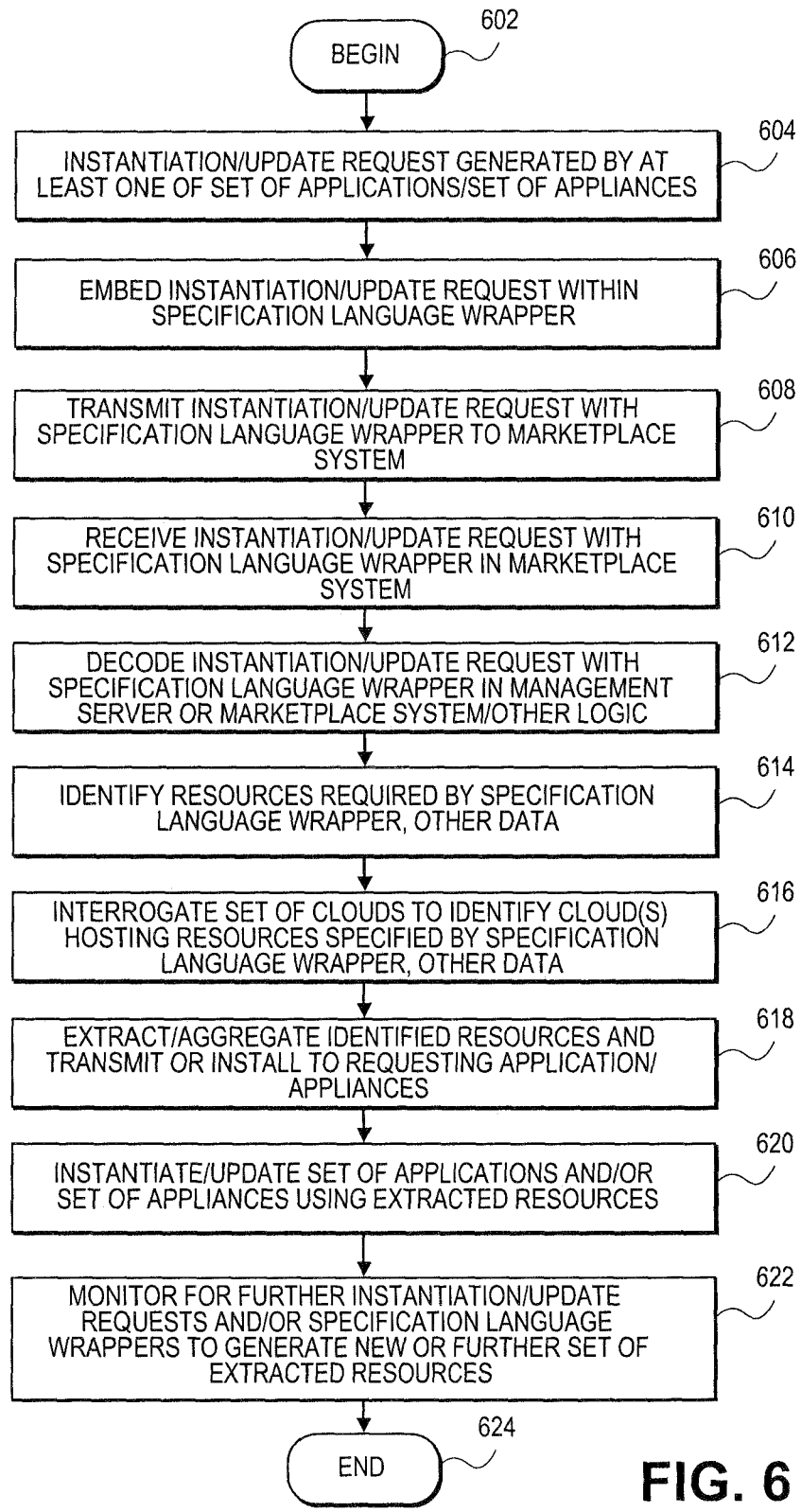
FIG. 6 illustrates a flowchart of overall processing for embedding a cloud-based resource request in a specification language wrapper, according to various embodiments.

FIG. 6 illustrates a flowchart of processing for embedding a cloud-based resource request in a specification language wrapper, according to various embodiments. In 602, processing can begin. In 604, at least one of a set of applications 308 and/or a set of software appliances 310 can generate an instantiation or update request 312. For example, an instantiation or update request 312 can be generated for a set of messaging, browser, or other applications that a user or resource wishes to install in or from a cloud. In 606, the instantiation or update request 312 can be embedded within a specification language wrapper 314. In embodiments, the specification language wrapper 314 can be encoded in extensible markup language (XML), and/or other languages, code, or platforms. In embodiments, the specification language wrapper 314 can encode the specific application, operating system, hardware, or other specifications of the instantiated/updated object, and/or the necessary resources that will be required to be extracted from the cloud to satisfy the instantiation or update request.

In 608, the instantiation or update request 312 embedded within specification language wrapper 314 can be transmitted from a user, client device, virtual machine, or other source to a cloud marketplace system 200 including a marketplace engine 205. In 610, the cloud marketplace system 200 can receive the instantiation or update request 312 embedded within specification language wrapper 314. In 612, the cloud marketplace system 200 via marketplace engine 205 or other logic can decode the instantiation or update request 312 embedded within specification language wrapper 314. In 614, the marketplace engine 205 or other logic can identify the necessary hardware, software, input/output (I/O), network, and/or other resources required by specification language wrapper 314 and other data. In 616, the marketplace engine 205 or other logic can interrogate a set of clouds 302 to identify clouds that have the resources corresponding to those specified in specification language wrapper 314 or other data. In 618, the management server 106 can extract the matching or most nearly matching resources, and aggregate, transmit, or install those resources to the requesting application/appliance. In 620, one or more applications in set of applications 308 and/or one or more software appliances in set of appliances 310 can be instantiated and/or updated or modified, using the resources extracted from set of clouds 302. In 622, the cloud marketplace system 200 can monitor for further resource requests and/or specification language wrappers to generate a new set of extracted resources from set of clouds 302, as appropriate. In 624, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which applications in set of application 308 and/or appliances within set of appliances 310 can have the same or consistent resource requirements, in embodiments, various applications and/or software appliances can have diverse and/or non-overlapping requirements for processor, memory, or any other resources. In further regards, resources described as singular or integrated in some embodiments can in embodiments be plural or distributed, and resources described as embodiments as multiple or distributed can in embodiments be combined. The scope of the present teachings is accordingly intended to be limited only by the following claims.

What is claimed is:

1. A method comprising:
    receiving, by a computing device communicably coupled via an interface to a set of cloud-based networks each managed by a different cloud management server, a request for cloud-based resources to support execution of an application and a software appliance, wherein each of the cloud-based networks deploys a set of hosted resources dedicated to the cloud-based network comprising processors, operating systems, and software combined together to form virtual machines that a set of subscribed users to the cloud-based network utilizes, and wherein each of the cloud-based networks comprises a different set of dedicated hosted resources and a different set of subscribed users;
    extracting, by the computing device, parameters from a specification language wrapper in which the request for cloud-based resources is embedded, the parameters associated with the application and the software appliance and comprising at least a number of requested virtual machines to instantiate and baseline parameters for each of the requested virtual machines to instantiate, the baseline parameters comprising at least one of processor cycles of the request virtual machine or allocated memory of the requested virtual machine;
    searching, by the computing device, a repository of the computing device that maintains resource and service data of the set of cloud-based networks, the searching to identify the resources of the resource and service data having a closest match to the extracted parameters;
    generating, by the computing a device, a report comprising:
        a list of one or more cloud-based networks from the set of cloud-based networks each having matching resource and service data to the extracted parameters; and
        a detail of computing resources and services provided by each of the listed one or more cloud-based networks;
    receiving, from an initiator of the request, a selection of resources from the report;
    identifying a plurality of cloud-based networks of the set of cloud-based networks to supply the selected resources; and
    causing, by the computing device, the identified plurality of cloud-based networks to instantiate the requested virtual machines to supply the selected resources to support execution of the application and the software appliance in the identified plurality of cloud-based networks.

2. The method of claim 1, wherein the request for cloud-based resources comprises a request that is part of an instantiation of the at least one of the application or the software appliance.

3. The method of claim 1, wherein the specification language wrapper comprises an extensible markup language (XML) wrapper.

4. The method of claim 1, wherein the parameters comprise at least one of a set of specified applications, an operating system, processor cycles, memory allocation, input/output (I/O) bandwidth, minimum uptime, instantiation schedule, subscription cost, network latency, or service level agreement.

5. The method of claim 1, further comprising providing an updated identification of the cloud-based network.

6. A network management system, comprising:
    a memory;
    a processor communicably coupled to the memory;
    a first communication interface to a set of cloud-based networks each managed by a different cloud management server;
    a second communication interface to at least one of an application or a software appliance; and
    a marketplace engine executable from the memory by the processor, the marketplace engine communicating with the set of cloud-based networks via the first interface and the at least one of the application or the software appliance via the second interface, and the marketplace engine to:
receive a request for cloud-based resources to support execution of an application and a software appliance, wherein each of the cloud-based networks deploys a set of hosted resources dedicated to the cloud-based network comprising processors, operating systems, and software combined together to form virtual machines that a set of subscribed users to the cloud-based network utilizes and wherein each of the cloud-based networks comprises a different set of dedicated hosted resources and a different set of subscribed users;
extract parameters from a specification language wrapper in which the request for cloud-based resources is embedded, the parameters associated with the application and the software appliance and comprising at least a number of requested virtual machines to instantiate and baseline parameters for each of the requested virtual machines to instantiate, the baseline parameters comprising at least one of processor cycles of the request virtual machine or allocated memory of the requested virtual machine;
search a repository of the computing device that maintains resource and service data of the set of cloud-based networks, the searching to identify the resources of the resource and service data having a closest match to the extracted parameters;
generate a report comprising:
a list of one or more cloud-based networks from the set of cloud-based networks each having matching resource and service data to the extracted parameters; and
a detail of computing resources and services provided by each of the listed one or more cloud-based networks;
receive, from an initiator of the request, a selection of resources from the report; and
identify a plurality of cloud-based networks of the set of cloud-based networks to supply the selected resources; and
cause the identified plurality of cloud-based networks to instantiate the requested virtual machines to supply the selected resources to support execution of the application and the software appliance in the identified plurality of cloud-based networks.

7. The network management system of claim 6, wherein the request for cloud-based resources comprises a request that is part of an instantiation of the at least one of the application or the software appliance.

8. The network management system of claim 6, wherein the specification language wrapper comprises an extensible markup language (XML) wrapper.

9. The network management system of claim 6, wherein the parameters comprise at least one of a set of specified applications, an operating system, processor cycles, memory allocation, input/output (I/O) bandwidth, minimum uptime, instantiation schedule, subscription cost, network latency, or service level agreement.

10. The network management system of claim 6, wherein the marketplace engine is further to provide an updated identification of the cloud-based network.

11. A non-transitory computer-readable storage medium including data that, when accessed by a computing device, cause the computing device to perform operations comprising:
receiving, by the computing device that is communicably coupled via an interface to a set of cloud-based networks each managed by a different cloud management server, a request for cloud-based resources to support execution of an application and a software appliance, wherein each of the cloud-based networks deploys a set of hosted resources dedicated to the cloud-based network comprising processors, operating systems, and software combined together to form virtual machines that a set of subscribed users to the cloud-based network utilizes and wherein each of the cloud-based networks comprises a different set of dedicated hosted resources and a different set of subscribed users;
extracting, by the computing device, parameters from a specification language wrapper in which the request for cloud-based resources is embedded, the parameters associated with the application and the software appliance and comprising at least a number of requested virtual machines to instantiate and baseline parameters for each of the requested virtual machines to instantiate, the baseline parameters comprising at least one of processor cycles of the request virtual machine or allocated memory of the requested virtual machine;
searching, by the computing device, a repository of the computing device that maintains resource and service data of the set of cloud-based networks, the searching to identify the resources of the resource and service data having a closest match to the extracted parameters;
generating, by the computing a device, a report comprising:
a list of one or more cloud-based networks from the set of cloud-based networks each having matching resource and service data to the extracted parameters; and
a detail of computing resources and services provided by each of the listed one or more cloud-based networks;
receiving, from an initiator of the request, a selection of resources from the report;
identifying a plurality of cloud-based networks of the set of cloud-based networks to supply the selected resources; and
causing, by the computing device, the identified plurality of cloud-based networks to instantiate the requested virtual machines to supply the selected resources to support execution of the application and the software appliance in the identified plurality of cloud-based networks.

12. The non-transitory computer-readable storage medium of claim 11, wherein the instantiated object comprises at least one of an application or a software appliance.

13. The non-transitory computer-readable storage medium of claim 11, wherein the specification language wrapper comprises an extensible markup language (XML) wrapper.

14. The non-transitory computer-readable storage medium of claim 11, wherein the parameters comprise at least one of a set of specified applications, an operating system, processor cycles, memory allocation, input/output (I/O) bandwidth, minimum uptime, instantiation schedule, subscription cost, network latency, or service level agreement.

15. The non-transitory computer-readable storage medium of claim 11, wherein the operations further comprise providing an updated identification of the cloud-based network.

* * * * *